(12) United States Patent
Takeuchi et al.

(10) Patent No.: US 12,529,352 B2
(45) Date of Patent: Jan. 20, 2026

(54) WING STRUCTURE AND WING STRUCTURE MANUFACTURING METHOD

(71) Applicant: MITSUBISHI HEAVY INDUSTRIES, LTD., Tokyo (JP)

(72) Inventors: Hiroaki Takeuchi, Tokyo (JP); Yasushi Okano, Tokyo (JP); Masaaki Shibata, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/560,043

(22) PCT Filed: Apr. 18, 2022

(86) PCT No.: PCT/JP2022/017981
§ 371 (c)(1),
(2) Date: Nov. 9, 2023

(87) PCT Pub. No.: WO2022/239603
PCT Pub. Date: Nov. 17, 2022

(65) Prior Publication Data
US 2024/0352918 A1  Oct. 24, 2024

(30) Foreign Application Priority Data
May 14, 2021  (JP) .................................. 2021-082549

(51) Int. Cl.
*F03D 1/06* (2006.01)
*B29D 99/00* (2010.01)
*B64C 3/28* (2006.01)

(52) U.S. Cl.
CPC ........ *F03D 1/0688* (2023.08); *F05B 2230/31* (2013.01); *F05B 2250/60* (2013.01)

(58) Field of Classification Search
CPC ...... F03D 1/0675; F03D 80/30; F03D 1/0688; F03D 1/065; F03D 1/0643; C23C 24/04;
(Continued)

(56) References Cited

U.S. PATENT DOCUMENTS 9,404,172 B2 *  8/2016  Clavette ................ F04D 29/324
2009/0169392 A1 *  7/2009  Kuroiwa ............... F03D 1/0675
416/241 A
(Continued)

FOREIGN PATENT DOCUMENTS

JP  2020084217 A   6/2020
JP  6838181 B1     3/2021
(Continued)

OTHER PUBLICATIONS

Machine Translation of JP2020084217 A [retrieved on Sep. 9, 2025]. Retrieved from: Espacenet. (Year: 2025).*
(Continued)

*Primary Examiner* — Eric J Zamora Alvarez
(74) *Attorney, Agent, or Firm* — HAUPTMAN HAM, LLP (57) ABSTRACT

Provided is a wing structure comprising a wing body formed from fiber-reinforced plastic (FRP), and an erosion suppression layer provided so as to cover at least a portion of a front edge of the wing structure. The erosion suppression layer contains a thermal spraying layer configured so as to maintain, by having a prescribed surface roughness, a liquid film formed on the erosion suppression layer.

8 Claims, 10 Drawing Sheets

(58) Field of Classification Search
CPC .......... F05B 2280/6011; F05B 2230/90; F05B 2240/30; F05B 2240/303; F05B 2240/32; F05B 2280/702; F05B 2280/6013; F05B 2230/31; F05B 2250/60; F01D 5/288; F01D 5/286; F01D 5/005; B29D 99/0025; B29D 99/0028; F05D 2230/90; F05D 2240/303; F04D 29/023; F04D 29/324; F04D 29/026; B64C 3/28; Y02E 10/72; Y02P 70/50

See application file for complete search history.

(56) References Cited

U.S. PATENT DOCUMENTS

| | | | |
|---|---|---|---|
| 2016/0075888 A1* | 3/2016 | Gu | C09D 5/1681 524/401 |
| 2017/0107413 A1 | 4/2017 | Wang et al. | |
| 2020/0158078 A1* | 5/2020 | Watanabe | C23C 28/02 |
| 2020/0370440 A1* | 11/2020 | Zhuk | F04D 29/026 |
| 2021/0262434 A1* | 8/2021 | Okano | F03D 1/0675 |
| 2023/0003187 A1 | 1/2023 | Watanabe et al. | |

FOREIGN PATENT DOCUMENTS

| | | |
|---|---|---|
| JP | 2021134693 A | 9/2021 |
| WO | 2018219524 A1 | 12/2018 |

OTHER PUBLICATIONS

George S. Springer, "Erosion by Liquid Impact" Fluid_Mechanics_Soviet_Research, p. 6-7; 2pp, 1976.

Akira Nakajima, "Science and Technology of Hydrophobic Solid Surface"; J. Surf. Finish. Soc. Jpn., 2-8, vol. 60, No. 1, 2009; 24pp.

Extended European Search Report of European Application No. 22807306.0 dated Sep. 10, 2024, 7pp.

Mahdipoor M S et al: "HVOF sprayed coatings of nano-agglomerated tungsten-carbide/cobalt powers for water droplet erosion application", Wear, vol. 330, Feb. 11, 2015, pp. 338-347, 11pp.

Japan Patent Office, Notice of Reasons for Refusal for Japanese Patent Application No. 2021-082549 mailed on Apr. 15, 2025; 13 pp.

* cited by examiner

WING SPANWISE DIRECTION

FIG. 12

WING STRUCTURE AND WING STRUCTURE MANUFACTURING METHOD

RELATED APPLICATIONS

The present application is a National Phase of International Application Number PCT/JP2022/017981 filed Apr. 18, 2022, and claims priority from Japanese Application Number 2021-082549 filed May 14, 2021.

TECHNICAL FIELD

The present disclosure relates to a wing structure and a wing structure manufacturing method.

The present application claims priority based on Japanese Patent Application No. 2021-082549 filed in Japan on May 14, 2021, the contents of which are incorporated herein by reference.

BACKGROUND ART

It is known that a wing structure moving in a high-speed fluid, such as a wind turbine wing, is eroded by collision with foreign matter (for example, raindrops, dust, etc.) in the air, and so-called erosion occurs on a leading edge side. In order to protect the wing structure from this erosion, measures such as forming a protective film for erosion resistance on a leading edge side of the wing structure are taken (for example, PTL 1).

PTL 1 discloses that a plurality of resin shields that cover at least a part of a leading edge of a rotor blade of a wind turbine are formed in advance in a shape corresponding to the leading edge, and the plurality of shields are arranged side by side with each other in a length direction of the rotor blade and attached to the rotor blade.

CITATION LIST

Patent Literature

[PTL 1] International Publication No. WO2018/219524

SUMMARY OF INVENTION

Technical Problem

The droplets collide with a surface of the protective film for erosion resistance formed on the leading edge side of the wing structure, and an impact pressure due to the collision of the droplets causes erosion in the protective film. Therefore, it is desired to improve erosion resistance performance of the protective film. In general, the surface of the protective film is formed in a smooth state without undulation in order to avoid a decrease in aerodynamic performance of the wing structure.

In view of the above-described circumstances, an object of at least one embodiment of the present disclosure is to provide a wing structure and a wing structure manufacturing method capable of improving erosion resistance performance.

Solution to Problem

A wing structure according to an embodiment of the present disclosure includes: a wing body formed of an FRP; and an erosion suppression layer provided to cover at least a part of a leading edge of the wing body, in which the erosion suppression layer includes a thermal spray layer configured to maintain a liquid film formed on the erosion suppression layer by having a predetermined surface roughness.

A wing structure manufacturing method according to an embodiment of the present disclosure includes: a step of preparing a wing body formed of an FRP; a thermal spray layer forming step of providing a thermal spray layer by thermal spraying so as to cover at least a part of a leading edge of the wing body; and a surface treatment step of performing a surface treatment of the thermal spray layer such that a surface of the thermal spray layer satisfies a condition of a root mean square height $Rq=5$ to $40$ μm after the thermal spray layer forming step.

Advantageous Effects of Invention

According to at least one embodiment of the present disclosure, there is provided a wing structure and a wing structure manufacturing method capable of improving erosion resistance performance.

DESCRIPTION OF EMBODIMENTS

Hereinafter, some embodiments of the present disclosure will be described with reference to the accompanying drawings. However, dimensions, materials, shapes, relative arrangements, and the like of components described as the embodiments or shown in the drawings are not intended to limit the scope of the present disclosure thereto and are merely explanatory examples.

For example, expressions representing relative or absolute arrangements such as "in a certain direction", "along a certain direction", "parallel", "orthogonal", "center", "concentric" or "coaxial" not only represent exactly such arrangements, but also represent states of relative displacement with a tolerance, or an angle or distance to the extent that the same function can be obtained.

For example, expressions representing that things are in an equal state, such as "identical", "equal", and "homogeneous", not only represent an exactly equal state, but also represent a state in which there is a tolerance or a difference to the extent that the same function can be obtained.

For example, expressions representing a shape such as a quadrangular shape or a cylindrical shape not only represent a shape such as a quadrangular shape or a cylindrical shape in a geometrically strict sense, but also represent a shape including an undulating portion, a chamfered portion, or the like to the extent that the same effect can be obtained.

Meanwhile, expressions "comprising", "including", or "having" one component are not exclusive expressions excluding the presence of other components.

Further, the same configurations may be denoted by the same reference signs, and the description thereof may not be repeated.

(Wing Structure)

Figure 1:
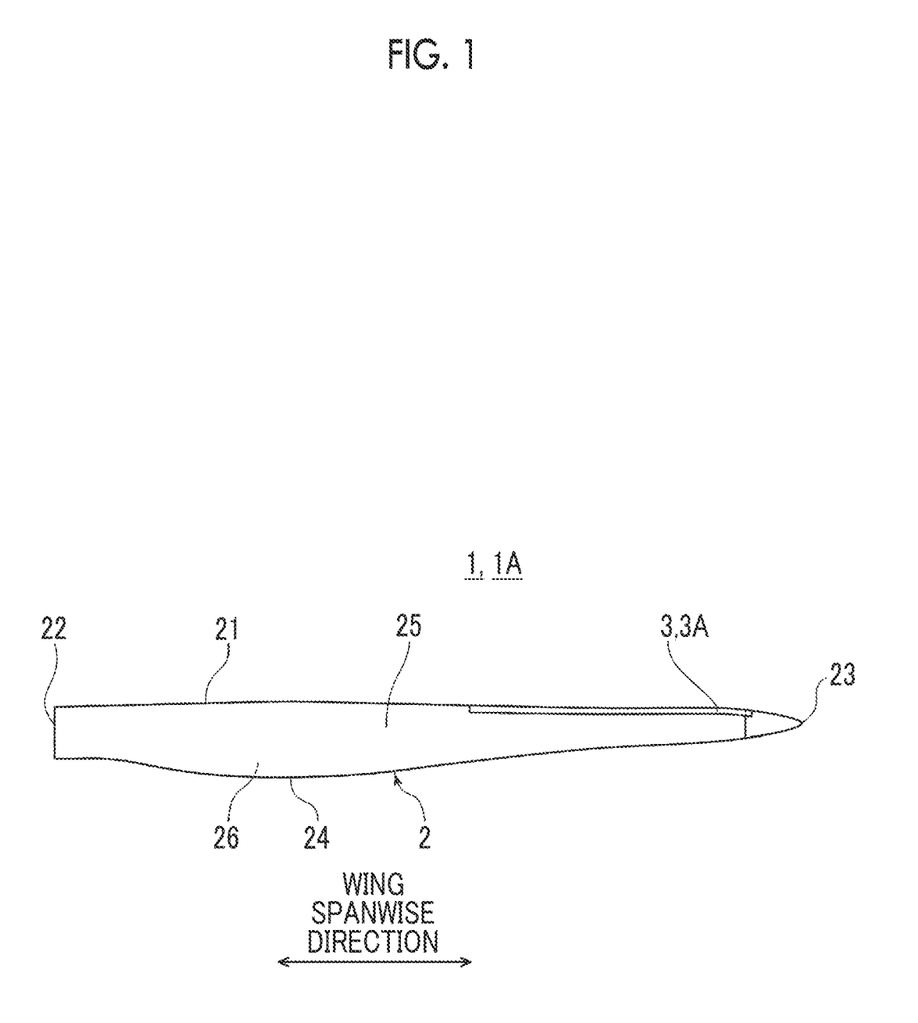
FIG. 1 is a plan view of a wing structure according to an embodiment of the present disclosure.
Figure 2:
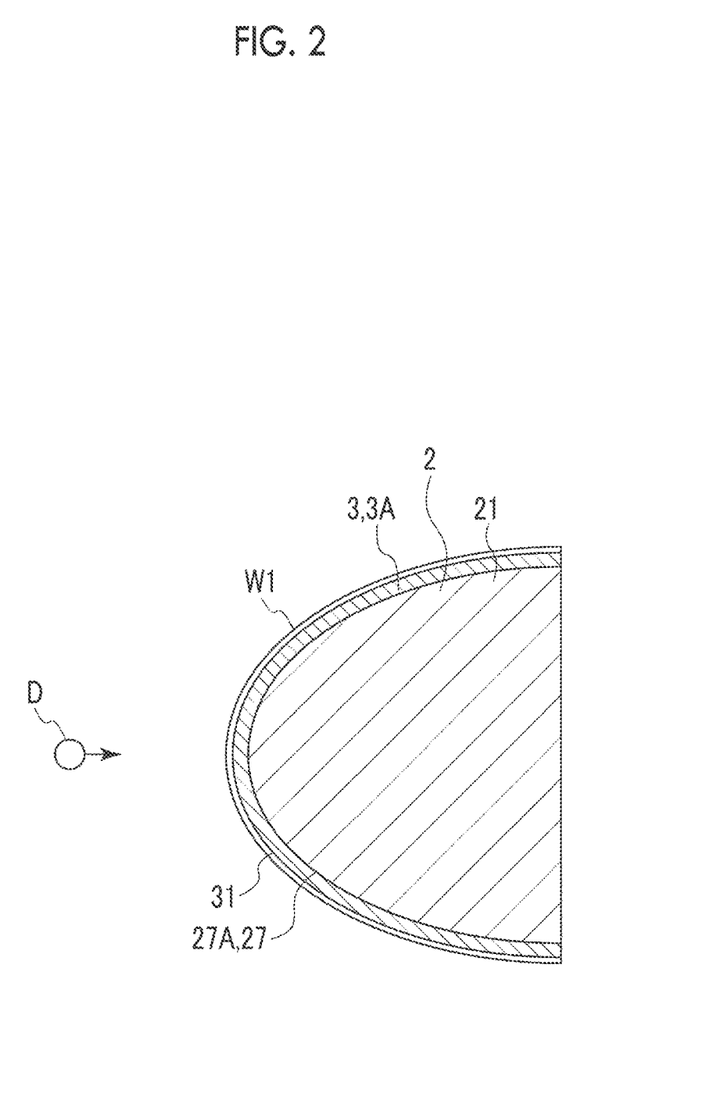
FIG. 2 is a schematic cross-sectional view of a vicinity of a leading edge of the wing structure shown in FIG. 1.

FIG. 1 is a plan view of a wing structure according to an embodiment of the present disclosure. FIG. 2 is a schematic cross-sectional view of a vicinity of a leading edge of the wing structure shown in FIG. 1. In FIG. 2, a cross section orthogonal to a length direction (wing spanwise direction) of a wing body is schematically shown.

As shown in FIG. 1, a wing structure 1 according to some embodiments includes a wing body 2 and an erosion suppression layer 3 provided to cover at least a part of a leading edge 21 of the wing body 2.

(Wing Body)

As shown in FIG. 1, the wing body 2 extends along the wing spanwise direction from a wing root 22 toward a wing tip 23. The wing body 2 includes the leading edge 21, a trailing edge 24, a pressure surface 25 which is one surface extending between the leading edge 21 and the trailing edge 24, and a suction surface 26 which is the other surface extending between the leading edge 21 and the trailing edge 24. Each of the leading edge 21 and the trailing edge 24 extends from the wing root 22 to the wing tip 23.

The wing body 2 is formed of a fiber-reinforced plastic material (FRP) such as a carbon fiber-reinforced plastic (CFRP) or a glass fiber-reinforced plastic (GFRP). As shown in FIG. 2, the wing body 2 includes a thermal spray target surface 27A, which is covered with the erosion suppression layer 3, in a part of a surface (outer surface of the leading edge 21) 27 of the wing body 2. The thermal spray target surface 27A is configured of a side of the surface 27 that includes at least a part of the leading edge 21.

(Erosion Suppression Layer)

As shown in FIG. 2, the erosion suppression layer 3 includes a thermal spray layer 3A formed on the (thermal spray target surface 27A) of the wing body 2 by thermal spraying. The thermal spray layer 3A is formed of a coating formed on the surface 27 of the wing body 2 by spraying a heated thermal spraying material onto the surface 27 of the wing body 2 which is a base material. The coating is formed when the thermal spraying material solidifies and adheres. The erosion suppression layer 3 functions as a protective layer (outermost layer) for protecting the wing body 2 from droplet erosion such as raindrops and dust.

(Erosion Process)

Figure 3:
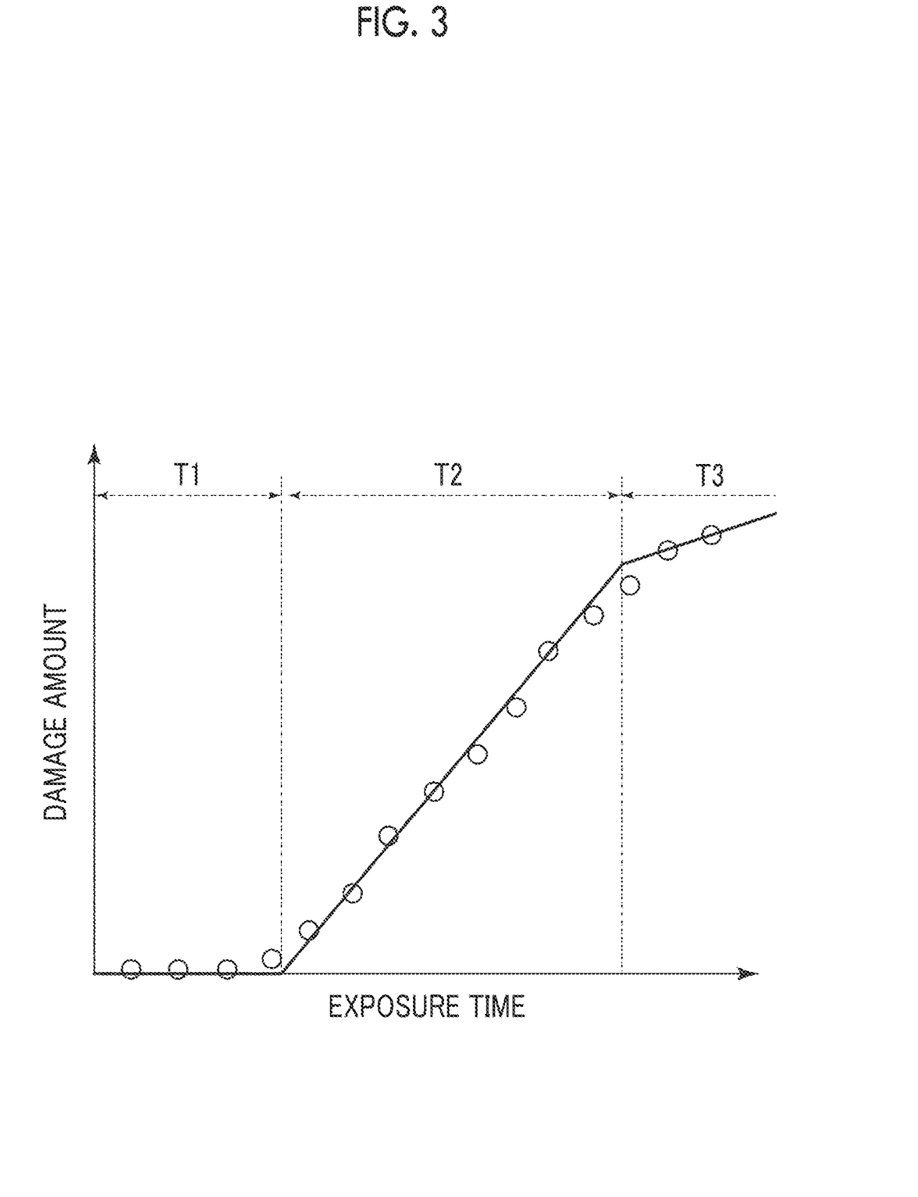
FIG. 3 is an explanatory diagram for explaining an erosion process.

FIG. 3 is an explanatory diagram for explaining an erosion process. FIG. 3 schematically shows a relationship between a damage amount caused by droplet erosion and a time with respect to a ductile metal. A vertical axis of FIG. 3 represents the damage amount caused by the droplet erosion, and the damage amount is represented by a decrease in mass of the ductile metal which is a material. A horizontal axis of FIG. 3 represents an exposure time indicating a period during which the material is exposed to droplets. The vertical axis of FIG. 3 may be a volume reduction, a damage depth, or the like of the material indicating a degree of damage due to the droplet erosion. In addition, an amount of liquid colliding per unit area and the number of collisions of the droplets per unit area may be on the horizontal axis of FIG. 3.

Figure 4:
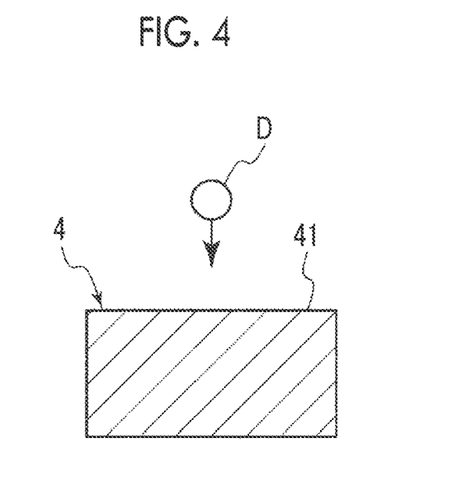
FIG. 4 is an explanatory diagram for explaining a surface of a material in a latency period shown in FIG. 3.
Figure 5:
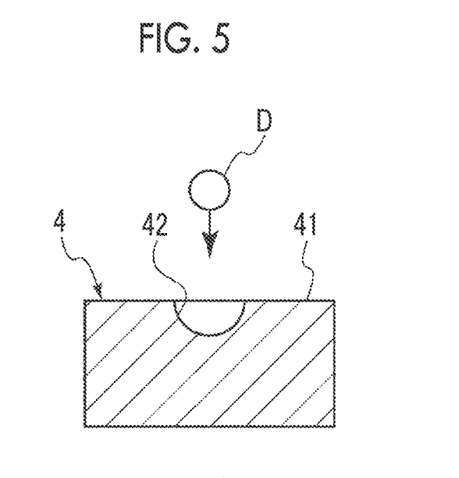
FIG. 5 is an explanatory diagram for explaining the surface of the material in a steady erosion rate period shown in FIG. 3.
Figure 6:
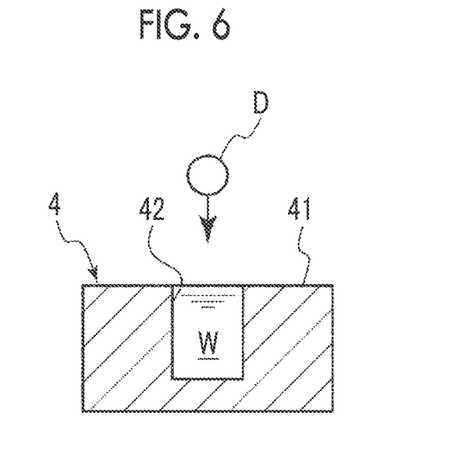
FIG. 6 is an explanatory diagram for explaining the surface of the material in a final erosion period shown in FIG. 3.

As shown in FIG. 3, the erosion process is roughly divided into three regions (latency period T1, steady erosion rate period T2, and final erosion period T3). FIG. 4 is an explanatory diagram for explaining a surface of the material in the latency period shown in FIG. 3. FIG. 5 is an explanatory diagram for explaining the surface of the material in the steady erosion rate period shown in FIG. 3. FIG. 6 is an explanatory diagram for explaining the surface of the material in the final erosion period shown in FIG. 3. In FIGS. 4 to 6, the droplet is denoted by D, and the material exposed to the droplet D is denoted by 4.

In the latency period T1 which is a first region, as shown in FIG. 4, the mass of the material 4 exposed to the droplet D is not significantly reduced, but elastic deformation or plastic deformation occurs in the material 4. Due to the plastic deformation, small undulation and dents occur in a surface 41 that has been smooth. As a result, the irregularity of the surface 41 increases, and the effect of stress concentration acts to gradually increase the damage to the material 4.

In the steady erosion rate period T2 which is a second region, an erosion rate is higher than that in the latency period T1 and the final erosion period T3, as shown in FIGS. 3 and 5, and the surface 41 of the material 4 is rapidly removed by the droplet erosion to form a pit 42. With the passage of time, a large number of the pits 42 are formed on the surface 41, so that the surface 41 becomes rough.

In the final erosion period T3 which is a third region, the erosion rate is lower than that in the steady erosion rate period T2. One of reasons for the decrease in the erosion rate is thought to be that as the surface 41 of the material 4 becomes rough, water W accumulates in the deepened pit 42, and the droplet D collides with the water W accumulated in the pit 42, so that the effect of softening the impact of the droplet D acts.

The present inventors have found that when the droplet D strikes the wing structure 1, the impact pressure due to the collision of the droplet D can be alleviated by maintaining a liquid film W1 formed by the droplet D on the erosion suppression layer 3. The erosion suppression layer 3 described above is configured of the thermal spray layer 3A configured to maintain the liquid film W1 formed on the erosion suppression layer 3 by having a predetermined surface roughness.

A surface 31 of the thermal spray layer 3A is provided in an undulating shape having a predetermined surface roughness, and when the droplet D strikes the thermal spray layer 3A, the liquid film W1 can be maintained by the undulating shape. In the illustrated embodiment, since the thermal spray layer 3A is made of a material having excellent wear resistance, such as a cermet or a Co alloy such as a Co (cobalt)-based alloy, the undulating shape is not easily deformed by the droplet D and can maintain a shape capable of maintaining the liquid film W1 for a long period of time.

As shown in FIG. 2, the wing structure 1 according to some embodiments includes the wing body 2 described above and the erosion suppression layer 3 described above. The erosion suppression layer 3 includes the thermal spray layer 3A configured to maintain the liquid film W1 formed on the erosion suppression layer 3 by having a predetermined surface roughness.

According to the above configuration, when the droplet D is struck on the wing structure 1, the thermal spray layer 3A having a predetermined surface roughness can maintain the liquid film W1 formed on the erosion suppression layer 3 by the droplet D. In this case, since the droplet D collides with the liquid film W1 formed on the erosion suppression layer 3, the impact pressure due to the collision of the droplet D can be alleviated as compared with a case where the droplet D directly collides with the erosion suppression layer 3 on which the liquid film W1 is not formed. By alleviating the impact pressure due to the collision of the droplet D, the progress of the erosion of the erosion suppression layer 3 can be suppressed, and further, the progress of the erosion of the leading edge 21 of the wing body 2 covered with the erosion suppression layer 3 can be suppressed. That is, the wing structure 1 can improve erosion resistance performance by maintaining the liquid film W1 formed on the erosion suppression layer 3 and reducing the impact of the droplet D with the liquid film W1.

In addition, in a case of thermal spraying on the wing body 2 formed of the FRP, the surface roughness of the thermal spray layer 3A tends to be larger than in a case of thermal spraying on the wing body 2 formed of a metallic material. For this reason, in the wing body 2 formed of the FRP, the surface 31 of the thermal spray layer 3A can be easily formed into an undulating shape having a predetermined surface roughness, as compared with the wing body 2 formed of the metallic material.

In some embodiments, the thermal spray layer 3A described above is made of a cermet or a Co alloy such as a Co-based alloy. The cermet contains at least one of alumina, tungsten carbide, silicon nitride, silicon carbide, zirconia, or chrome carbide. The thermal spray layer 3A is preferably made of a Co-based alloy or the like, which is excellent in corrosion resistance, wear resistance, and high-temperature strength. In a certain embodiment, the Co-based alloy constituting the thermal spray layer 3A contains at least Cr (chromium) and C (carbon), and the balance consists of Co. The Co-based alloy constituting the thermal spray layer 3A may further contain at least one of Mo (molybdenum), Si (silicon), W (tungsten), Ni (nickel), and Fe (iron). According to the above configuration, since the thermal spray layer 3A is made of a material having excellent heat resistance and wear resistance, such as a cermet or a Co alloy such as a Co-based alloy, high erosion resistance performance can be exhibited. In some other embodiments, the thermal spray layer 3A described above may be made of a material other than the cermet or the Co alloy.

In some embodiments, the surface roughness of the surface 31 of the thermal spray layer 3A described above satisfies a condition of a root mean square height Rq=5 to 40 µm. According to the above configuration, the liquid film W1 formed on the surface 31 of the thermal spray layer 3A can be maintained effectively by making the surface 31 of the thermal spray layer 3A rough to satisfy the condition of the root mean square height Rq=5 to 40 µm. Therefore, the impact pressure due to the collision of the droplet D can be alleviated by the liquid film W1.

If the surface roughness of the surface 31 of the thermal spray layer 3A is too small (for example, Rq<5 µm), it may be difficult to maintain the liquid film W1. If the surface roughness of the surface 31 of the thermal spray layer 3A is too large (for example, Rq>40 µm), frictional resistance received by the thermal spray layer 3A increases, which may cause a decrease in the aerodynamic performance of the wing structure 1. It is preferable that the surface roughness of the surface 31 of the thermal spray layer 3A described above satisfies the condition of the root mean square height Rq=10 to 30 µm.

(Wettability of Surface of Thermal Spray Layer)

Figure 7:
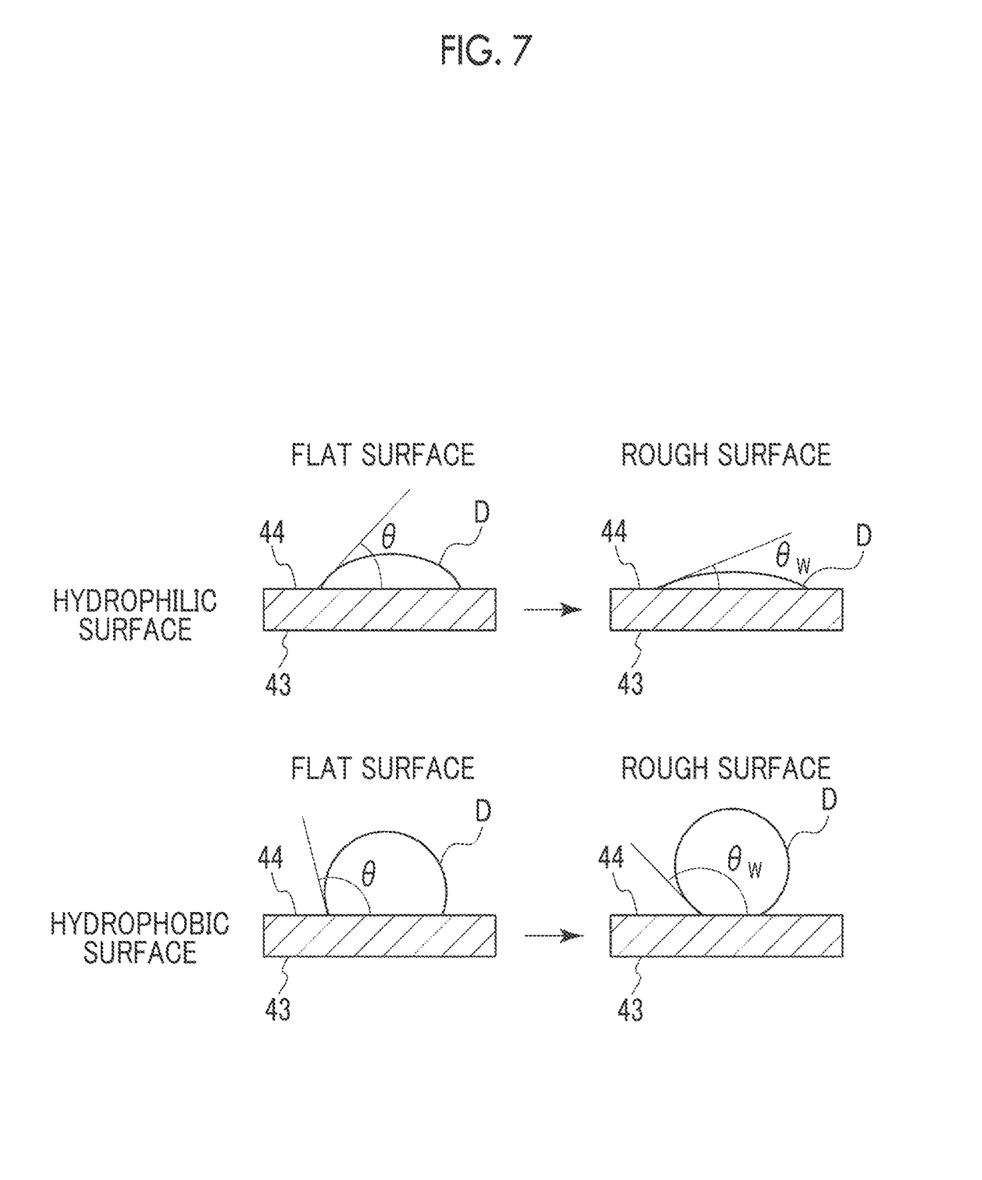
FIG. 7 is an explanatory diagram for explaining wettability.

Whether or not the liquid film W1 can be maintained on the surface 31 of the thermal spray layer 3A is related to wettability of the surface 31. FIG. 7 is an explanatory diagram for explaining wettability. As shown in FIG. 7, when the droplet D is formed on a surface 44 of a solid 43, a tangent line of an outer edge portion (contact line) of the droplet D and the surface 44 are in an equilibrium state with a contact angle by surface tension between the solid 43 and the droplet D. The smaller the contact angle, the better the wettability and the higher the affinity (easiness of adhesion) of the liquid. θw in FIG. 7 represents a contact angle with respect to a rough surface, and θ in FIG. 7 represents a contact angle with respect to a flat surface made of the same material as the rough surface. As shown in FIG. 7, in a hydrophilic surface satisfying a condition of a contact angle θ<90°, the contact angle θw tends to decrease as the surface roughness increases. On the other hand, in a hydrophobic surface satisfying a condition of the contact angle θ>90°, the contact angle θw tends to increase as the surface roughness increases.

When the contact angle of the thermal spray layer 3A with respect to the rough surface having the predetermined surface roughness is defined as θw, and the contact angle of the thermal spray layer 3A with respect to the flat surface made of the same material as the thermal spray layer 3A is defined as θ, the wettability of the surface 31 of the thermal spray layer 3A can be expressed by the following Wenzel equation (1).

$$\cos\theta w = r \cdot \cos\theta \tag{1}$$

Note that r in the above equation (1) represents an area ratio of the rough surface to the flat surface, and the rougher the surface, the larger the area ratio r. An area ratio r=1.7 or less is an applicable range of the above equation (1).

Figure 8:
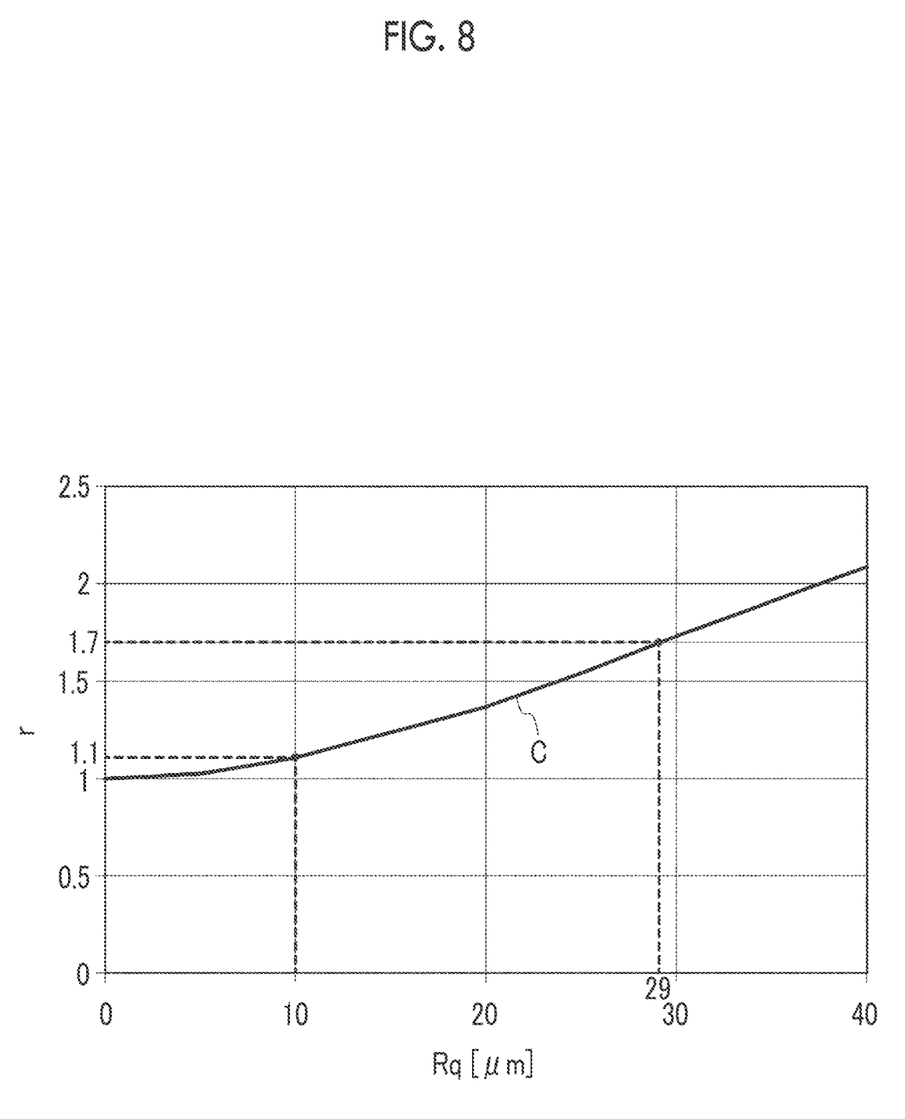
FIG. 8 is an explanatory diagram for explaining a relationship between an area ratio r and a root mean square height Rq.

In some embodiments, the surface roughness of the surface 31 of the thermal spray layer 3A described above satisfies the area ratio r=1.1 to 1.7 in the above equation (1). FIG. 8 is an explanatory diagram for explaining a relationship between the area ratio r and the root mean square height Rq. In FIG. 8, the area ratio r is on a vertical axis, and the root mean square height Rq is on a horizontal axis. FIG. 8 shows a curve C showing the relationship between the area ratio r and the root mean square height Rq. The curve C is obtained by constructing a surface roughness with the root mean square height Rq as a parameter by numerical simulation, calculating the surface area of the surface roughness, and calculating the area ratio r from the calculated surface area. As shown in FIG. 8, the curve C rises after exceeding Rq=10 µm (r=1.1) and increases monotonically. Further, in FIG. 8, Rq is 29 µm when a condition of r=1.7 is satisfied. Therefore, satisfying the area ratio r=1.1 to 1.7 can be rephrased as satisfying the root mean square height Rq=10 to 29 µm. By defining the surface roughness of the surface 31 of the thermal spray layer 3A in a range of r=1.1 to r=1.7, which is an inflection point, appropriate wettability is obtained, and the liquid film W1 can be effectively maintained on the surface 31.

According to the above configuration, the liquid film W1 formed on the surface 31 of the thermal spray layer 3A can be effectively maintained by making the surface 31 of the thermal spray layer 3A rough to satisfy r=1.1 to 1.7 in the above equation (1). Therefore, the impact pressure due to the collision of the droplets can be alleviated by the liquid film W1.

Figure 9:
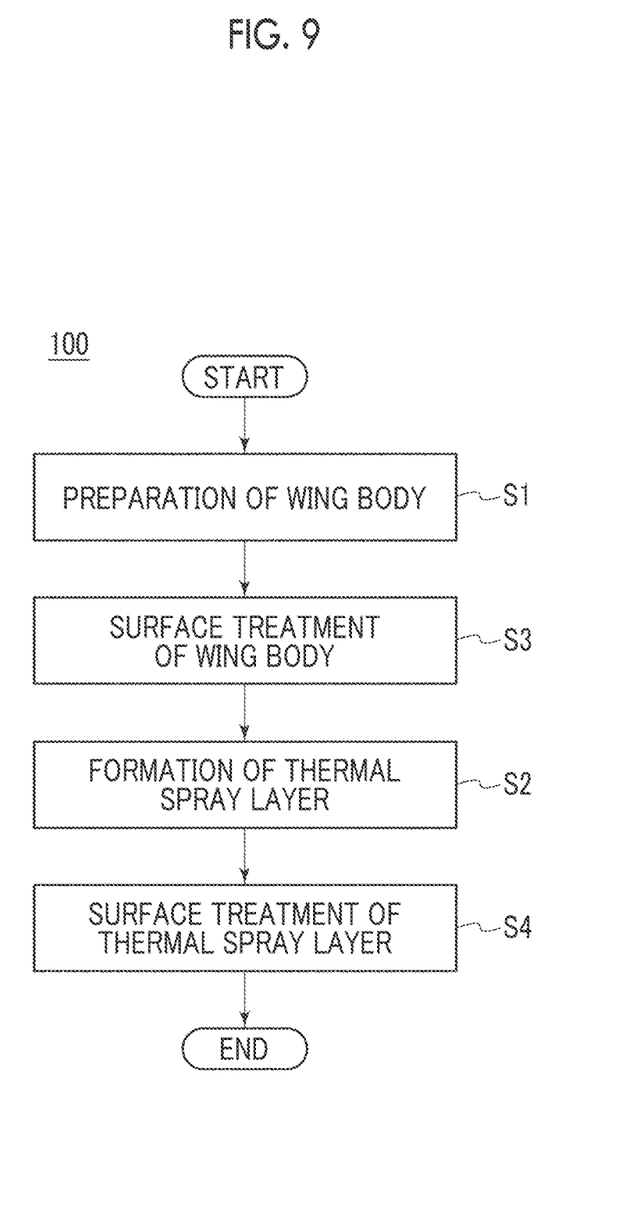
FIG. 9 is a flow chart showing an example of a wing structure manufacturing method according to an embodiment of the present disclosure.

FIG. 9 is a flow chart showing an example of a wing structure manufacturing method according to an embodiment of the present disclosure. As shown in FIG. 9, a manufacturing method 100 of the wing structure 1 includes a preparation step S1 of preparing the wing body 2 described above and a thermal spray layer forming step S2 of providing the thermal spray layer 3A by thermal spraying to cover at least a part of the leading edge 21 of the wing body 2.

(Base Treatment)

As shown in FIG. 9, the manufacturing method 100 of the wing structure 1 may further include a base treatment step S3 of performing a surface treatment on the thermal spray target surface 27A of the wing body 2 such that the thermal spray target surface 27A has a predetermined surface roughness before the thermal spray layer forming step S2. In the base treatment step S3, the undulation is formed on the thermal spray target surface 27A by performing at least one of a mechanical treatment such as blasting and shot peening, a thermal treatment such as laser processing, a chemical treatment such as etching, and mechanical processing such as grinding. In a certain embodiment, in the base treatment step S3, the surface treatment of the thermal spray target surface 27A is performed such that the surface roughness of the thermal spray target surface 27A satisfies a condition of the arithmetic average roughness Ra=3.2 to 6.3 μm.

In some embodiments, the wing body 2 of the wing structure 1 described above includes the thermal spray target surface 27A that is covered with the erosion suppression layer 3 (thermal spray layer 3A). The surface roughness of the thermal spray target surface 27A satisfies a condition of the arithmetic average roughness Ra=3.2 to 6.3 μm. According to the above configuration, by making thermal spray target surface 27A rough to satisfy a condition of the arithmetic average roughness Ra=3.2 to 6.3 μm, the surface 31 having a suitable roughness reflecting the surface roughness of the thermal spray target surface 27A, that is, a roughness capable of maintaining the liquid film W1 on the thermal spray layer 3A, is formed on the thermal spray layer 3A provided on the thermal spray target surface 27A by thermal spraying.

(Surface Treatment of Thermal Spray Layer)

As shown in FIG. 9, the manufacturing method 100 of the wing structure 1 may further include a surface treatment step S4 of performing a surface treatment on the thermal spray layer 3A such that the surface 31 of the thermal spray layer 3A has a predetermined surface roughness after the thermal spray layer forming step S2. In the surface treatment step S4, the undulation is formed on the surface 31 of the thermal spray layer 3A by performing at least one of a mechanical treatment such as blasting and shot peening, a thermal treatment such as laser processing, a chemical treatment such as etching, and mechanical processing such as grinding. In a certain embodiment, in the surface treatment step S4, the surface treatment of the surface 31 of the thermal spray layer 3A is performed such that the surface roughness of the surface 31 satisfies a condition of Rq=5 to 40 μm. In the surface treatment step S4, the surface treatment of the surface 31 of the thermal spray layer 3A may be performed such that the surface roughness of the surface 31 satisfies any condition of Rq=10 to 30 μm or Rq=10 to 29 μm.

According to the above method, by performing the surface treatment of the thermal spray layer 3A such that the surface 31 of the thermal spray layer 3A has a roughness (for example, Rq=5 to 40 μm) capable of maintaining the liquid film W1, the liquid film W1 formed on the surface 31 of the thermal spray layer 3A can be effectively maintained by the droplets that are struck on the wing structure 1. Therefore, the impact pressure due to the collision of the droplet D can be alleviated by the liquid film W1. In addition, according to the above method, even after the thermal spray layer 3A is formed, the surface 31 of the thermal spray layer 3A can be made to have a predetermined roughness (for example, Rq=5 to 40 μm). Therefore, even after the thermal spray layer 3A is formed, the erosion resistance performance can be improved.

(Wind Turbine Generator)

Figure 10:
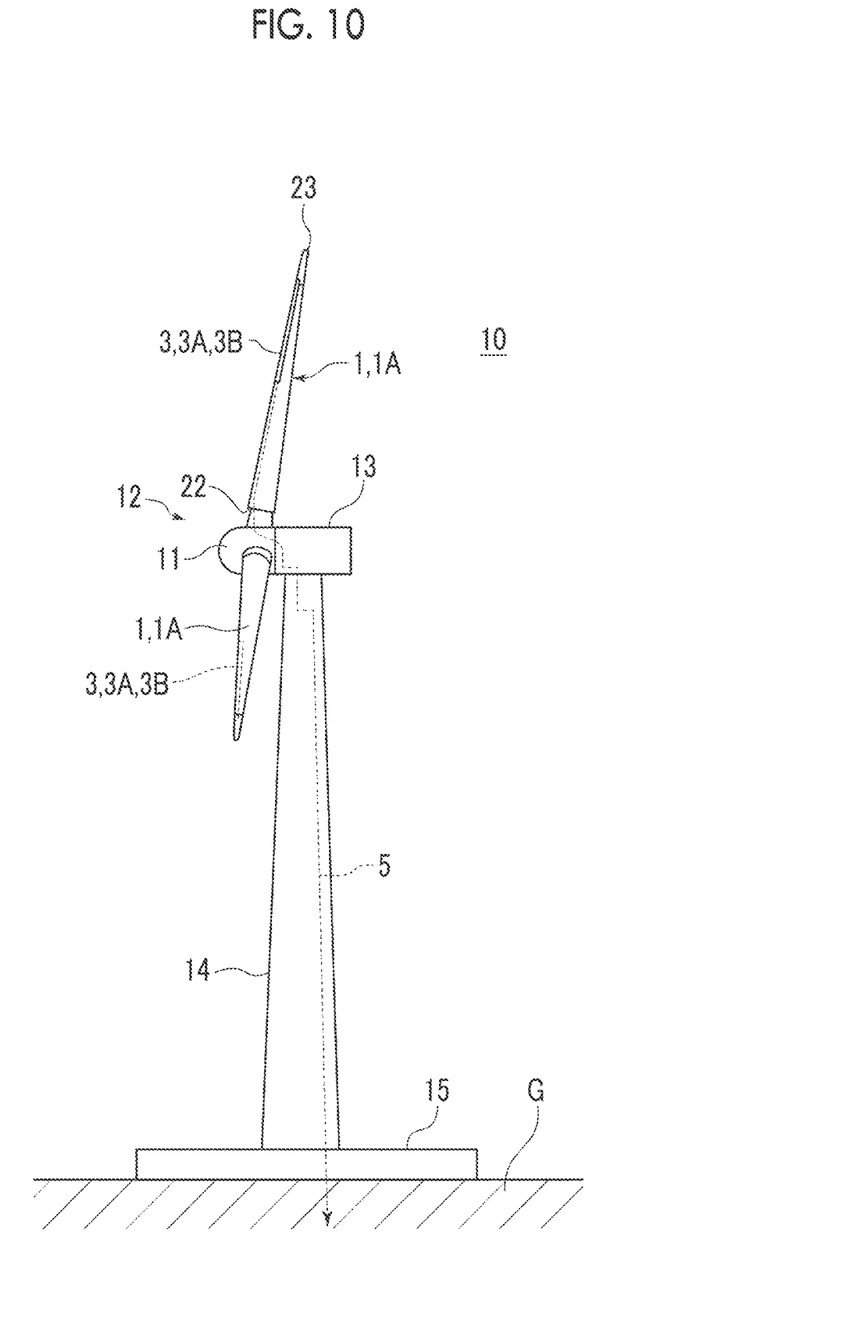
FIG. 10 is a schematic configuration diagram of a wind turbine generator including the wing structure according to the embodiment of the present disclosure.

FIG. 10 is a schematic configuration diagram of a wind turbine generator including the wing structure according to the embodiment of the present disclosure. In some embodiments, as shown in FIG. 10, the wing structure 1 described above is configured of a wind turbine wing 1A. The wind turbine generator 10 includes at least one wind turbine wing 1A, a hub 11 to which the wind turbine wing 1A is attached, a generator (not shown) driven by rotation of the hub 11, a nacelle 13 rotatably supporting a rotor 12 (wind turbine rotor) including the wind turbine wing 1A and the hub 11, a tower 14 supporting the nacelle 13, and a base 15 provided on a ground G and supporting the tower 14.

The wind turbine generator 10 may include a plurality of wind turbine wings 1A that are attached to the hub 11 so as to be arranged radially. In other words, the at least one wind turbine wing 1A described above may include a plurality of wind turbine wings 1A that are attached to the hub 11 so as to be arranged radially. In each of the plurality of wind turbine wings 1A, the wing root 22 is fixed to the hub 11, and the wing tip 23 is located outside the wing root 22 in a radial direction with the hub 11 as a center. The tower 14 and the base 15 are provided upright onshore or offshore. FIG. 10 shows a case where the tower 14 and the base 15 are installed onshore.

In the wind turbine generator 10, the rotor 12 including the wind turbine wing 1A rotates by receiving the wind, and a rotational force of the rotor 12 is transmitted to a generator (not shown) to generate electric power in the generator.

The wing structure 1 according to the present disclosure is applicable to other than the wind turbine wing 1A. For example, in a certain embodiment, the wing structure 1 is configured of an aircraft wing. In a case where the wing structure 1 is used as the wind turbine wing 1A or the aircraft wing, it is necessary to protect the wing structure 1 from lightning strikes.

(Lightning Strike Protection Structure of Wing Structure)

Figure 11:
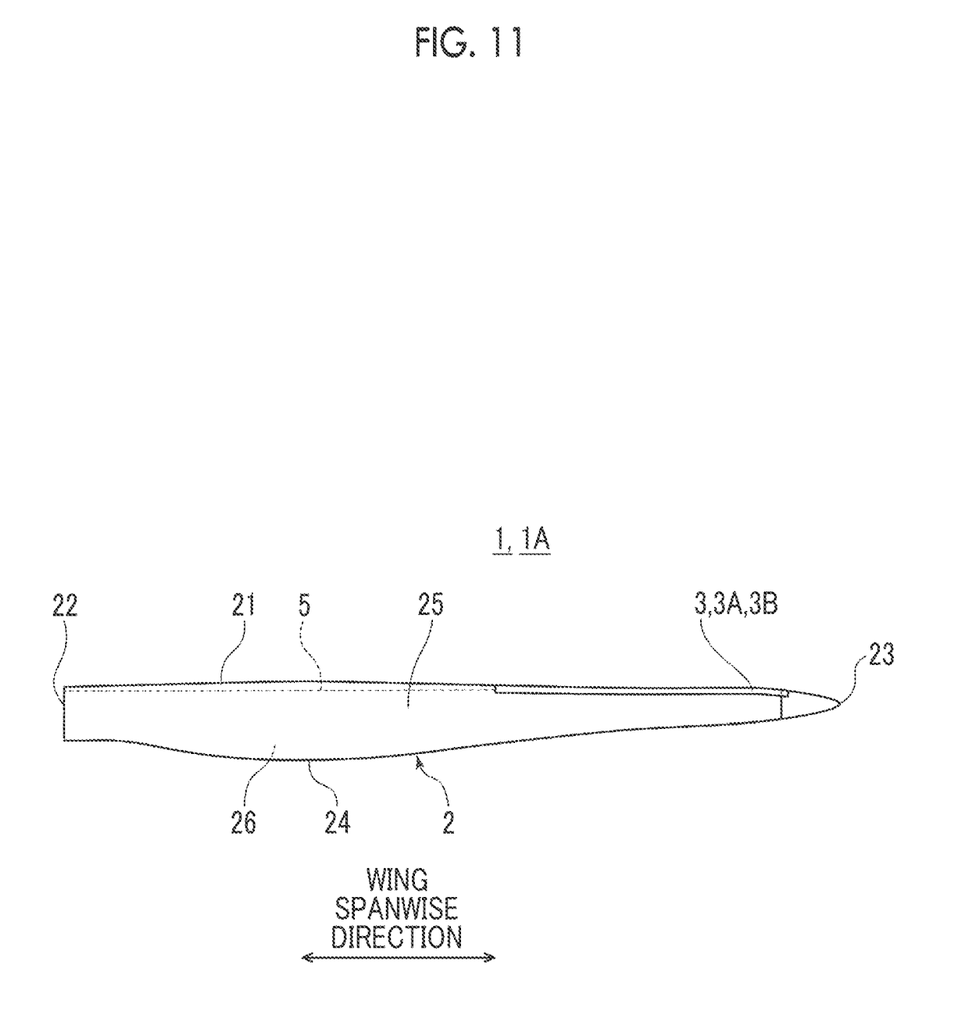
FIG. 11 is a plan view of a wing structure according to an embodiment of the present disclosure.
Figure 12:
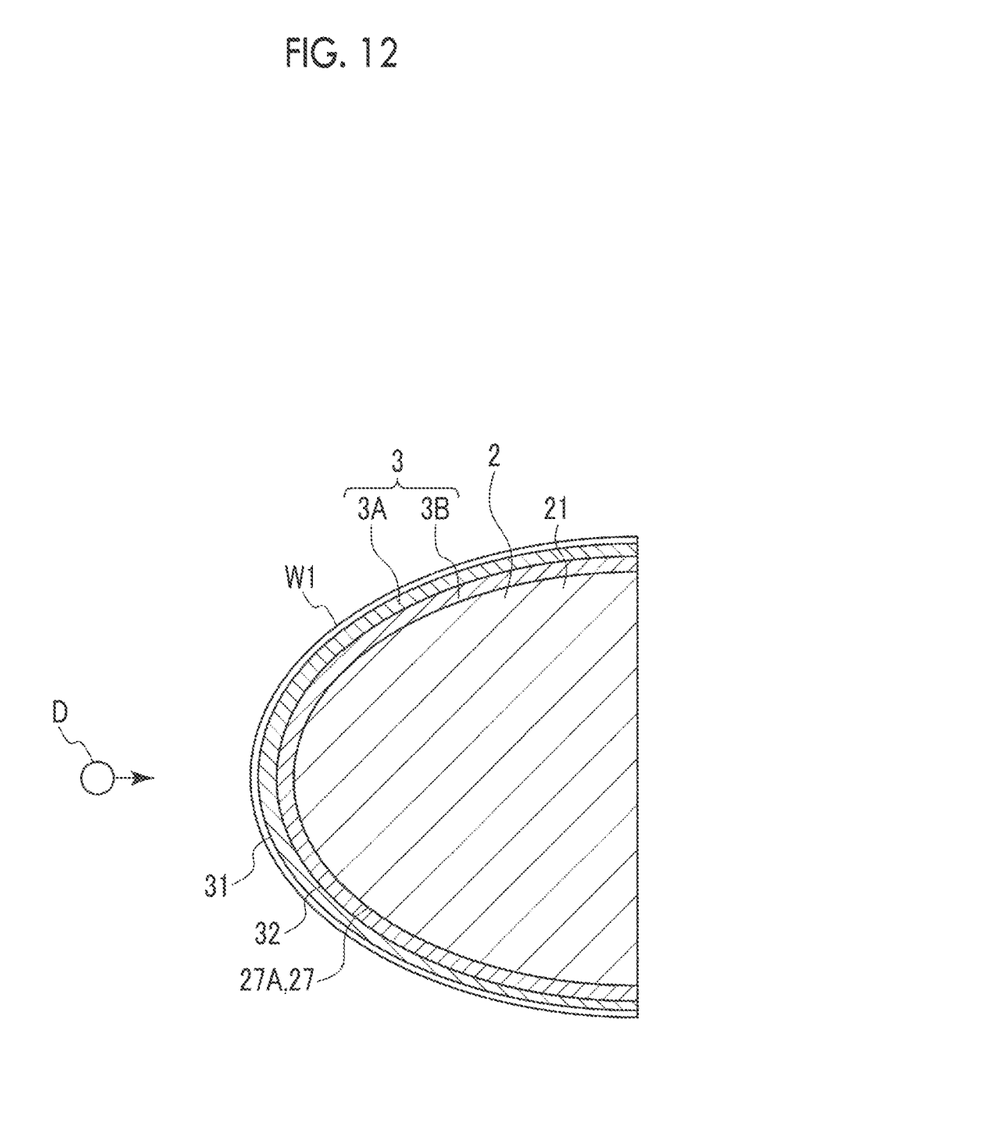
FIG. 12 is a schematic cross-sectional view of a vicinity of a leading edge of the wing structure shown in FIG. 11.

FIG. 11 is a plan view of a wing structure according to an embodiment of the present disclosure. FIG. 12 is a schematic cross-sectional view of a vicinity of a leading edge of the wing structure shown in FIG. 11. In FIG. 12, a cross section orthogonal to a length direction (wing spanwise direction) of a wing body is schematically shown.

In some embodiments, as shown in FIG. 11, the wing structure 1 described above includes the wing body 2 described above, the erosion suppression layer 3 described above, and a conductive portion 5. As shown in FIG. 12, the erosion suppression layer 3 includes the thermal spray layer 3A described above and an intermediate layer 3B formed between the wing body 2 and the thermal spray layer 3A. The intermediate layer 3B has an electrical resistivity lower than that of the thermal spray layer 3A. As shown in FIG. 10, the conductive portion 5 connects the intermediate layer 3B to the ground G. In other words, the intermediate layer 3B is electrically connected to the ground G via the conductive portion 5. Here, the "ground" means a place where a current such as a lightning current generated in the wing structure 1 is finally discharged.

In a case where lightning strikes the thermal spray layer 3A, since the intermediate layer 3B having an electrical resistivity lower than that of the thermal spray layer 3A exists immediately below the thermal spray layer 3A, the lightning current charged to the thermal spray layer 3A can quickly flow to the ground G side via the intermediate layer 3B and the conductive portion 5. As a result, the damage to the thermal spray layer 3A, the intermediate layer 3B, and the wing body 2 due to the lightning current can be suppressed. The intermediate layer 3B does not necessarily have to be provided over an entire region of the thermal spray layer 3A. However, by providing the intermediate layer 3B over the entire region of the thermal spray layer 3A, the lightning current charged to the thermal spray layer 3A can quickly flow to the ground G side via the intermediate layer 3B.

As shown in FIG. 12, the intermediate layer 3B is provided on the thermal spray target surface 27A of the wing body 2. The intermediate layer 3B is formed on the thermal spray target surface 27A of the wing body 2 before the thermal spray layer 3A is formed. Similarly to the thermal spray layer 3A, the intermediate layer 3B also functions as a protective layer for protecting the wing body 2 from droplet erosion such as raindrops and dust. The intermediate layer 3B can be formed by various methods. For example, the intermediate layer 3B may be formed by thermal spraying, or the intermediate layer 3B formed in a sheet shape may be attached to the surface 27 of the wing body 2. The thermal spray layer 3A is provided on the intermediate layer 3B. The thermal spray layer 3A is formed of a coating formed on a surface 32 of the intermediate layer 3B by spraying a heated thermal spraying material onto the surface 32 of the intermediate layer 3B.

The above-described manufacturing method 100 of the wing structure 1 may further include an intermediate layer forming step of providing the intermediate layer 3B so as to cover at least a part of the leading edge 21 of the wing body 2 before the thermal spray layer forming step S2. In addition, the manufacturing method 100 of the wing structure 1 may further include a surface treatment step of performing a surface treatment (base treatment) of the intermediate layer 3B such that the intermediate layer 3B has a predetermined surface roughness (for example, Ra=3.2 to 6.3 µm) before the thermal spray layer forming step S2.

In some embodiments, the intermediate layer 3B is made of copper, a copper alloy, aluminum, or an aluminum alloy. As the aluminum alloy, for example, duralumin can be applied. By configuring the intermediate layer 3B with such a material having a low electrical resistivity, the lightning current charged to the thermal spray layer 3A can easily flow to the ground G side, and an escape effect of the lightning current charged to the thermal spray layer 3A can be improved. Further, by configuring the intermediate layer 3B with the above-mentioned material, the intermediate layer 3B has a smaller hardness and Young's modulus than those of the thermal spray layer 3A, so that aggression to the wing body 2 is low, and adhesion to the wing body 2 high. With such an intermediate layer 3B, it is possible to prevent the thermal spray layer 3A from being delaminated or falling off from the wing body 2.

In some embodiments, as shown in FIG. 11, each of the thermal spray layer 3A described above and the intermediate layer 3B described above is provided in at least a part of a region from the wing tip 23 of the wing body 2 to ½ of the length of the wing body 2 in the length direction (wing spanwise direction) of the wing body 2. Since the erosion depends on a circumferential speed, for example, in the wind turbine wing 1A or the like, the wing tip 23 side of the wing body 2 is more susceptible to the erosion than the wing root 22 side of the wing body 2. According to the above configuration, it is possible to improve the erosion resistance performance in a region susceptible to the erosion by providing each of the thermal spray layer 3A and the intermediate layer 3B in at least a part of a region from the wing tip 23 of the wing body 2 to ½ of the length of the wing body 2 in the length direction of the wing body 2.

Further, in a case of a configuration in which the wing structure 1 does not include the intermediate layer 3B, the thermal spray layer 3A may be provided in at least a part of a region from the wing tip 23 of the wing body 2 to ½ of the length of the wing body 2 in the length direction (wing spanwise direction) of the wing body 2.

In some embodiments, a total thickness of the thermal spray layer 3A described above and the intermediate layer 3B described above satisfies a condition of 200 µm or more and 2000 µm or less. In this case, while ensuring erosion resistance by the thermal spray layer 3A, it is possible to prevent the thermal spray layer 3A and the intermediate layer 3B covering the thermal spray target surface 27A of the wing body 2 from becoming excessively thick. Since it is possible to adjust a thickness with high accuracy such that a step does not occur between the surface 31 of the erosion suppression layer 3 and the surface 27 of the wing body 2, the aerodynamic performance of the wing structure 1 can be maintained high even after the formation of the erosion suppression layer 3.

A thickness of the thermal spray layer 3A is mainly determined by a tip circumferential speed of the wing structure 1 (wind turbine wing 1A), and a thickness of the intermediate layer 3B is mainly determined by the necessity of an electrical resistivity or the like. In a certain embodiment, the thickness of the thermal spray layer 3A is in a range of 100 to 1000 µm and the thickness of the intermediate layer 3B is in a range of 100 to 1000 µm. Accordingly, the thermal spray layer 3A can ensure erosion resistance performance and coating strength capable of withstanding the tip circumferential speed of the wing structure 1 (wind turbine wing 1A). The intermediate layer 3B can ensure a cross-sectional area for ensuring necessary electric conductivity by lowering the electrical resistivity.

In a case where the wing structure 1 does not include the intermediate layer 3B, the thickness of the thermal spray layer 3A may be in a range of 100 to 1000 µm.

The present disclosure is not limited to the above-described embodiment and includes embodiments with modifications on the above-described embodiment or combinations of these embodiments as appropriate.

The contents described in some embodiments described above are understood as follows, for example.

1) A wing structure (1) according to at least one embodiment of the present disclosure includes: a wing body (2) formed of an FRP; and an erosion suppression layer (3) provided to cover at least a part of a leading edge (21) of the wing body (2), in which the erosion suppression layer (3)

includes a thermal spray layer (3A) configured to maintain a liquid film formed on the erosion suppression layer (3) by having a predetermined surface roughness.

According to the configuration of the above 1), when the droplet is struck on the wing structure (1), the thermal spray layer (3A) having a predetermined surface roughness can maintain the liquid film formed on the erosion suppression layer (3) by the droplet. In this case, by causing the droplet to collide with the liquid film formed on the erosion suppression layer (3), the impact pressure due to the collision of the droplet can be alleviated as compared with a case where the droplet directly collides with the erosion suppression layer (3) on which the liquid film is not formed. By alleviating the impact pressure due to the collision of the droplet, the progress of the erosion of the erosion suppression layer (3) can be suppressed, and further, the progress of the erosion of the leading edge (21) of the wing body (2) covered with the erosion suppression layer (3) can be suppressed. That is, the wing structure (1) can improve erosion resistance performance by maintaining the liquid film formed on the erosion suppression layer (3) and reducing the impact of the droplet with the liquid film.

2) In some embodiments, in the wing structure (1) according to the above 1), the predetermined surface roughness of the thermal spray layer (3A) satisfies a condition of a root mean square height Rq=5 to 40 µm.

According to the configuration of above 2), the liquid film formed on the surface (31) of the thermal spray layer (3A) can be maintained effectively by making the surface (31) of the thermal spray layer (3A) rough to satisfy the condition of the root mean square height Rq=5 to 40 µm. Therefore, the impact pressure due to the collision of the droplets can be alleviated by the liquid film.

3) In some embodiments, in the wing structure (1) according to the above 1) or 2), when a contact angle of the thermal spray layer (3A) with respect to a rough surface having the predetermined surface roughness is defined as θw and a contact angle of the thermal spray layer (3A) with respect to a flat surface formed of the same material as the thermal spray layer (3A) is defined as θ, the predetermined surface roughness of the thermal spray layer (3A) satisfies r=1.1 to 1.7 in the following equation (1):

$$\cos\theta w = r \cdot \cos\theta.$$

According to the configuration of the above 3), the liquid film formed on the surface (31) of the thermal spray layer (3A) can be effectively maintained by making the surface (31) of the thermal spray layer (3A) rough to satisfy r=1.1 to 1.7 in the above equation (1). Therefore, the impact pressure due to the collision of the droplets can be alleviated by the liquid film.

4) In some embodiments, in the wing structure (1) according to any one of the above 1) to 3), the wing body (2) includes a thermal spray target surface (27A) which is covered with the erosion suppression layer (3), and a surface roughness of the thermal spray target surface (27A) satisfies a condition of an arithmetic average roughness Ra=3.2 to 6.3 µm.

According to the configuration of the above 4), by making thermal spray target surface (27A) rough to satisfy a condition of the arithmetic average roughness Ra=3.2 to 6.3 µm, the surface (31) having a suitable roughness reflecting the surface roughness of the thermal spray target surface (27A), that is, a roughness capable of maintaining the liquid film on the thermal spray layer (3A) is formed on the thermal spray layer (3A) provided on the thermal spray target surface (27A) by thermal spraying.

5) In some embodiments, in the wing structure (1) according to any one of the above 1) to 4), the thermal spray layer (3A) is composed of a cermet containing at least one of alumina, tungsten carbide, silicon nitride, silicon carbide, zirconia, or chrome carbide, or a Co alloy.

According to the configuration of the above 5), since the thermal spray layer (3A) is made of a material having excellent heat resistance and wear resistance, such as a cermet or a Co alloy, high erosion resistance performance can be exhibited.

6) In some embodiments, in the wing structure (1) according to any one of the above 1) to 5), the erosion suppression layer (3) further includes an intermediate layer (3B) formed between the wing body (2) and the thermal spray layer (3A) and having an electrical resistivity smaller than that of the thermal spray layer (3A), and the wing structure (1) further includes a conductive portion (5) that electrically connects the intermediate layer (3B) to a ground.

According to the configuration of the above 6), by providing the intermediate layer (3B) having a low electrical resistivity between the thermal spray layer (3A), which is an erosion resistant film, and the wing body (2), the lightning current charged to the thermal spray layer (3A) can quickly flow to the ground side via the intermediate layer (3B), thereby suppressing damage to the thermal spray layer (3A), the intermediate layer (3B), and the wing body (2) due to the lightning current.

7) In some embodiments, in the wing structure (1) according to the above 6), each of the thermal spray layer (3A) and the intermediate layer (3B) is provided in at least a part of a region from a wing tip (23) of the wing body (2) to ½ of a length of the wing body (2) in a length direction of the wing body (2).

Since the erosion depends on a circumferential speed, the wing tip (23) side of the wing body (2) is more susceptible to the erosion than the wing root (22) side of the wing body (2). According to the configuration of the above 7), it is possible to improve the erosion resistance performance in a region susceptible to the erosion by providing each of the thermal spray layer (3A) and the intermediate layer (3B) in at least a part of a region from the wing tip (23) of the wing body (2) to ½ of the length of the wing body (2) in the length direction of the wing body (2).

8) In some embodiments, in the wing structure (1) according to the above 6) or 7), a total thickness of the thermal spray layer (3A) and the intermediate layer (3B) satisfies a condition of 200 µm or more and 2000 µm or less.

According to the configuration of the above 8), the total thickness of the thermal spray layer (3A) and the intermediate layer (3B) satisfies the condition of 200 µm or more and 2000 µm or less. In this case, it is possible to prevent the thermal spray layer (3A) and the intermediate layer (3B) covering the thermal spray target surface (27A) of the wing body (2) from becoming excessively thick while ensuring the erosion resistance of the thermal spray layer (3A). Since it is possible to adjust a thickness with high accuracy such that a step does not occur between the surface (31) of the erosion suppression layer (3) and the surface (27) of the wing body (2), the aerodynamic performance of the wing structure (1) can be maintained high even after the formation of the erosion suppression layer (3).

9) A manufacturing method (100) of the wing structure (1) according to at least one embodiment of the present disclosure includes: a step (S1) of preparing a wing body (2)

formed of an FRP; a thermal spray layer forming step (S2) of providing a thermal spray layer (3A) by thermal spraying so as to cover at least a part of a leading edge (21) of the wing body (2); and a surface treatment step (S4) of performing a surface treatment of the thermal spray layer (3A) such that a surface (31) of the thermal spray layer (3A) satisfies a condition of a root mean square height Rq=5 to 40 μm after the thermal spray layer forming step (S2).

According to the method of the above 9), by performing the surface treatment of the thermal spray layer (3A) to make the surface (31) of the thermal spray layer (3A) rough to satisfy the condition of the root mean square height Rq=5 to 40 μm, the liquid film formed on the surface (31) of the thermal spray layer (3A) can be effectively maintained by the droplets that are struck on the wing structure (1). Therefore, the impact pressure due to the collision of the droplets can be alleviated by the liquid film. In addition, according to the method of the above 9), even after the thermal spray layer (3A) is formed, the surface (31) of the thermal spray layer (3A) has a predetermined roughness (roughness satisfying the condition of the root mean square height Rq=5 to 40 μm). Therefore, even after the thermal spray layer (3A) is formed, the erosion resistance performance can be improved.

REFERENCE SIGNS LIST

1: wing structure
1A: wind turbine wing
2: wing body
3: erosion suppression layer
3A: thermal spray layer
3B: intermediate layer
4: material
5: conductive portion
10: wind turbine generator
11: hub
12: rotor
13: nacelle
14: tower
15: base
21: leading edge
22: wing root
23: wing tip
24: trailing edge
25: pressure surface
26: suction surface
27: surface (of wing body)
27A: thermal spray target surface
31: surface (of thermal spray layer)
32: surface (of intermediate layer)
41, 44: surface
42: pit
43: solid
100: manufacturing method of wing structure
C: curve
D: droplet
G: ground
Ra: arithmetic average roughness
Rq: root mean square height
S1: preparation step
S2: thermal spray layer forming step
S3: base treatment step
S4: surface treatment step
T1: latency period
T2: steady erosion rate period
T3: final erosion period
W: water
W1: liquid film
r: area ratio
θ: contact angle with respect to flat surface
θw: contact angle with respect to rough surface

The invention claimed is:

1. A wing structure comprising:
a wing body formed of a fiber-reinforced plastic material (FRP); and
an erosion suppression layer provided to cover at least a part of a leading edge of the wing body,
wherein the erosion suppression layer includes a thermal spray layer configured to satisfy a condition of surface roughness with a root mean square height Rq=5 μm to 40 μm.

2. The wing structure according to claim 1, wherein when a first contact angle of the thermal spray layer with respect to a rough surface having a first surface roughness is defined as θw and a second contact angle of the thermal spray layer with respect to a flat surface formed of the same material as the thermal spray layer is defined as θ, a second surface roughness of the thermal spray layer satisfies r=1.1 to 1.7 in the following equation (1):

$$\cos\theta w = r \cdot \cos\theta.$$

3. The wing structure according to claim 1, wherein the wing body includes a thermal spray target surface which is covered with the erosion suppression layer, and
a surface roughness of the thermal spray target surface satisfies a condition of an arithmetic average roughness Ra=3.2 to 6.3 μm.

4. The wing structure according to claim 1, wherein the thermal spray layer is composed of a cermet containing at least one of alumina, tungsten carbide, silicon nitride, silicon carbide, zirconia, or chrome carbide, or a Co alloy.

5. The wing structure according to claim 1, wherein the erosion suppression layer further includes an intermediate layer formed between the wing body and the thermal spray layer and having an electrical resistivity smaller than that of the thermal spray layer, and
the wing structure further comprises a conductive portion that electrically connects the intermediate layer to a ground.

6. The wing structure according to claim 5, wherein each of the thermal spray layer and the intermediate layer is provided in at least a part of a region from a wing tip of the wing body to ½ of a length of the wing body in a length direction of the wing body.

7. The wing structure according to claim 5, wherein a total thickness of the thermal spray layer and the intermediate layer satisfies a condition of 200 μm or more and 2000 μm or less.

8. A wing structure manufacturing method, for manufacturing the wing structure of claim 1, comprising:
a step of preparing the wing body formed of the fiber-reinforced plastic material (FRP);
a thermal spray layer forming step of providing the thermal spray layer by thermal spraying so as to cover at least a part of the leading edge of the wing body; and
a surface treatment step of performing a surface treatment of the thermal spray layer such that a surface of the thermal spray layer satisfies the condition of the root mean square height $Rq=5$ to $40$ μm after the thermal spray layer forming step.

* * * * *